United States Patent [19]
Tucker

[11] 3,786,261
[45] Jan. 15, 1974

[54] OPTICAL SCANNING DEVICE

[75] Inventor: Lorn Kenneth Tucker, Miami Lakes, Fla.

[73] Assignee: Coulter Electronics, Inc., Hialeah, Fla.

[22] Filed: Oct. 12, 1971

[21] Appl. No.: 188,123

[52] U.S. Cl. ......... 250/205, 250/211 J, 250/211 R, 250/218, 250/220 C, 250/222 PC, 356/208
[51] Int. Cl. ..... G01j 1/32, G06m 7/00, G01n 21/26
[58] Field of Search ................ 250/211 J, 222 PC, 250/218, 211 R, 220 C, 205; 356/208

[56] References Cited
UNITED STATES PATENTS

| | | | |
|---|---|---|---|
| 2,411,092 | 11/1946 | Hood et al. | 250/211 R |
| 3,414,733 | 12/1968 | Wunderman | 250/211 J |
| 2,824,977 | 2/1958 | Pankove | 250/211 J |
| 3,398,286 | 8/1968 | Ford et al. | 250/218 X |
| 3,665,201 | 5/1972 | Shea | 356/208 |
| 3,306,157 | 2/1967 | Hach | 250/218 |

Primary Examiner—Archie R. Borchelt
Assistant Examiner—T. N. Grigsby
Attorney—I. Irving Silverman et al.

[57] ABSTRACT

The device includes a novel photosensor having two sides, a photoreceiving surface on one side thereof, and a passageway or hole extending through the photosensor. The photosensor is positioned in the path of a light beam with the hole in alignment with the light beam for passing the same through the photosensor. A flow stream containing particles is directed across the path of the light beam and some of the light deflected (scattered) by the particles impinges on the photoreceiving surface and generates an electrical signal which can be utilized for determining the size, number and/or concentration of particles suspended in the flow stream.

13 Claims, 5 Drawing Figures

OPTICAL SCANNING DEVICE

BACKGROUND OF THE INVENTION

The present invention relates to photo-cell circuits and apparatus containing same, particularly apparatus wherein a fluent material traverses an optical path. More specifically the present invention relates to an optical scanning device such as an optical particle sensing device and to a novel photosensor therefor. The device is of the type which is used for detecting particles or minute discontinuities in light transmitting gases, liquids or solids by detecting light scattered by the particles. More specifically, such devices are used in making quantitative and qualitative evaluation of: air pollutants, particles or particulate matter in a fluid, bubbles in a liquid, or particles or bubbles in a plastic, glass or other solid.

Heretofore a variety of optical particle sensing devices has been proposed wherein means are provided for directing a fluent material through and transversely of the optical path of a light beam. Some of the light in the beam strikes particles in the fluent material and is deflected or scattered in several directions. Thus some of the light will be deflected backward, (back scattered light) some of the light will be deflected approximately 90° to the axis of the optical path, and some of the light will be deflected forward (forward scattered light). By measuring some of this scattered light an indication can be obtained of the size, number and/or concentration of the particles in the fluent material.

In many optical particle sensing devices the forward scattered light is measured by placing light reflectors in the area around the light beam and outwardly thereof in positions to receive the forward scattered light and deflect the same toward the photoreceiving surface of a photosensor such as a photomultiplier located downstream of the light beam and in the optical path of the light beam.

Since it is desired to measure only the scattered light some means must be provided for preventing the direct light of the light beam from reaching the photosensor. In this respect, many of the previously proposed optical particle sensing devices mount a light trap downstream from the point where the light impinges upon particles in the fluent material and in front of the photosensor for the purpose of trapping the non-scattered light of the light beam. The reflectors, of course, are positioned to deflect the scattered light around the light trap and onto the photoreceiving surface of the photosensor.

One problem or disadvantage incurred with many of the prior devices is the inability of these devices to trap all of the non-scattered light from the light beam. In other words, there oftentimes is some non-scattered stray light from the light beam which is not trapped and which is picked up by the photosensor. Such stray light pick up results in erroneous measurements of the size, number and concentration of particles in the fluent material.

With a view toward overcoming this disadvantage a variety of solutions have been proposed for minimizing or eliminating stray light and thereby improve the accuracy of measurements of scattered light. For example, an improved light trap has been proposed which includes a tube having an optically black inner surface and having a portion thereof angled outwardly from the optical sensing device whereby light received into the tube is either absorbed by the optical black surface or reflected toward the outer end of the tube and out of the optical particle sensing device.

Another disadvantage incurred with the previously proposed optical particle sensing devices is the limitation on or inflexibility in the positioning of the photosensor relative to the point where light impinges upon particles in the flow stream of fluent material and is deflected or scattered. In this respect, with a light trap mounted in front of the photosensor, there is a limit upon the minimum distance of the photosensor from the point of light scattering. Since the scattered light spreads out as it leaves the point of light scattering, the further the photosensor, the greater the area of photoreceiving surface needed to pick up or sense light scattered within a given angle from reflect light scattered within the given angle onto a given photoreceiving surface area. This is what is done in most known optical scanning devices. Nevertheless the further the photosensor from the point of light scattering, the greater the possibility of error in the measurements of scattered light.

Examples of previously proposed apparatus of the type described above for determining particle size, concentration and/or number are disclosed in: U.S. Pat. No. 2,486,622 issued to L. White, Jr. on Nov. 1, 1949 and directed to a photoelectric apparatus for determining the physical properties of substances by alternating exposure to light; U.S. Pat. No. 2,732,753 issued to C. T. O'Konski on Jan. 31, 1956 and directed to a means for circulating a particle carrying stream through an illumination zone; U.S. Pat. No. 2,775,159 issued to J. C. Frommer on Dec. 25, 1956 and directed to a method and apparatus for the counting of particles per unit volume in a fluid; U.S. Pat. No. 3,127,464 issued to F. R. Gustafson on Mar. 31, 1964 and directed to a light source standardizing device; U.S. Pat. No. 3,231,748 issued on Jan. 25, 1966 to W. M. Haessler et al. and directed to a smoke detector; U.S. Pat. No. 3,248,551 issued to J. C. Frommer on Apr. 26, 1966 and directed to an optical arrangement for sensing very small particles; U.S. Pat. No. 3,361,030 issued to L. J. Goldberg on Jan. 2, 1968 and directed to a system and method for detecting small particles; U.S. Pat. No. 3,398,286 issued on Aug. 10, 1968 to D. L. Ford et al. and directed to a radiation sensitive evaporative analyzer; U.S. Pat. No. 3,431,423 issued to J. D. Keller on Mar. 4, 1969 and directed to a forward scatter photometer; U.S. Pat. No. 3,564,263 issued on Feb. 16, 1961 to C. C. Shaw and directed to an optical particle sensor having a light collector mounted on the photosensor.

The present invention overcomes many of the disadvantages and problems incurred with the prior optical sensing devices by providing a novel optical particle sensing device which has a novel photosensor and which does not include or need reflectors and does not need a light trap. Also the optical particle sensing device of the present invention is less expensive and more accurate than the heretofore proposed optical particle sensing devices. Additionally the photoreceiving surface on the photosensor of the optical particle sensing device of the present invention can be located at any desired distance from the point of impingement of the light in the light beam upon the particles as desired and may be flush with the periphery of the flow stream of fluent material. This flexibility in locating the photoreceiving surface of the photosensor is not obtainable with many of the presently known optical particle sensing devices.

SUMMARY OF THE INVENTION

According to the present invention there is provided a novel photosensor having at least two sides, a photoreceiving surface on one side, and a passageway or hole which extends fully through the photosensor. There is also provided an optical scanning device which includes the novel photosensor. The device includes a sensing zone into which a light beam is focused. The photosensor is situated proximate to the sensing zone with the photoreceiving surface in position to receive some of the light scattered from the sensing zone and with the passageway in alignment with the light beam for passing the direct or non-scattered light of the light beam through the photosensor.

DESCRIPTION OF THE PREFERRED EMBODIMENTS OF THE INVENTION

Figure 1:
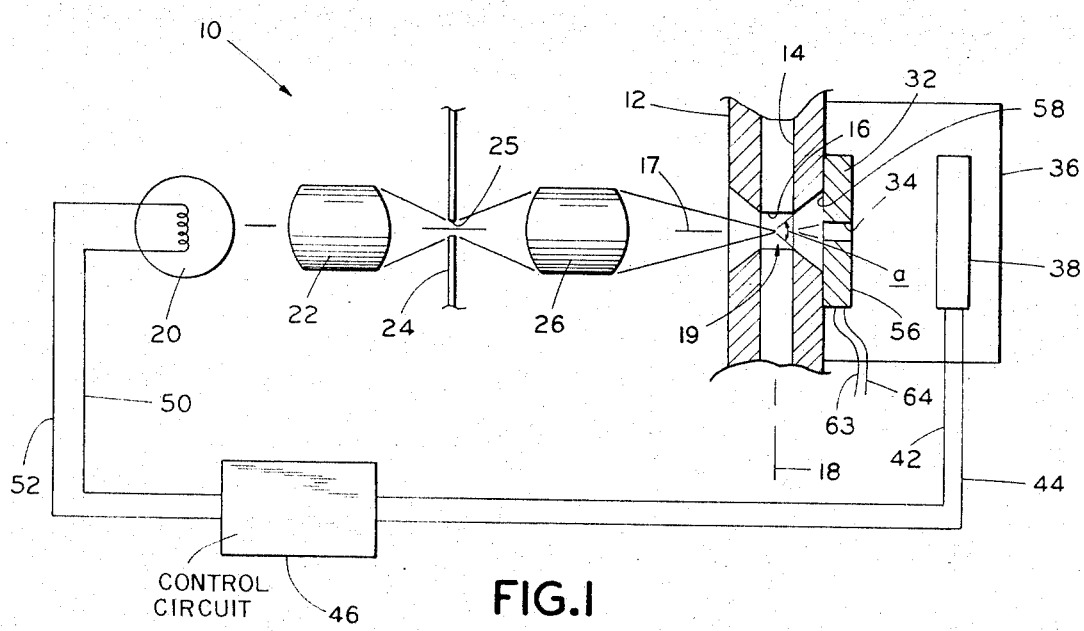
FIG. 1 is an enlarged fragmentary view partly in cross section and partly schematic, of the optical scanning device of the present invention.

Referring now to the drawing in greater detail, the optical particle sensing device of the present invention is shown at 10 in FIG. 1 and includes a structure 12, which may be a block, for passing fluent material through the device 10. For this purpose the block 12 includes a fluid passagesay 14. The block 12 also includes an optical or light beam passageway 16 which extends through the block 12 with the longitudinal axis 17 thereof generally normal to the longitudinal axis 18 of the fluid passageway 14 and which traverses or intersects the fluid passageway 14. The space 19 formed at the intersection of the fluid passageway 14 and the optical passageway 16 forms a sensing zone which may be referred to as the view volume.

The device 10 also includes a light source 20 spaced from and in alignment with the longitudinal axis 17 of the optical passageway 16. Light from the light source 20 is directed along an optical path which is coaxial with the axis 17 of the optical passageway 16. Positioned along the optical path and on the axis 17 thereof are a condenser lens 22, an aperture plate or iris 24 having an aperture 25 and an objective lens 26. As is well known in the field of optical particle sensing devices, light from the light source 20 is collected by the condenser lens 22 and then directed toward the aperture 25 in the aperture plate 24. The light appearing at the aperture 25 is then focused by the objective lens 26 into the view volume 19. Preferably, the magnification by the objective lens 26 is 0.5 so that the diameter of the light focused at the center of the view volume is half the diameter of the aperture 25 and so that the intensity of the light focused by the objective lens 26 at the center of the view volume is twice the intensity of the light appearing at the aperture 25.

In accordance with the teachings of the present invention a novel photosensor 32 is situated in the optical path of the light beam from the light source and in the illustrated embodiment is fixed to the block 12 at the downstream end of the optical passageway 16. As shown, the photosensor 32 has a passageway or hole 34 therethrough which is aligned with the light beam (the focused light) for passing same therethrough. It is contemplated that in some embodiments the light beam will be passed directly into the ambient environment; however, in the illustrated embodiment, a light beam receiving structure 36 is positioned behind the photosensor 32 for receiving the light passing through the hole 34 of the photosensor 32. A second photosensor 38 without hole therethrough is mounted in the structure 36 so that the light passing through the hole 34 is sensed by the second photosensor 38 to generate an electrical signal which is fed via leads 42 and 44 to an electrical control circuit shown schematically at 46. The control circuit 46 includes a power supply for the light source and is connected thereto by leads 50 and 52. In this embodiment of the optical particle sensing device 10 of the present invention the control circuit controls the intensity of the light from the light source 20 relative to the light received by the second photosensor 38. In other words, accurate control of the light intensity of the light focused at the center of the view volume 19 is obtained with the feedback loop including the light source 20, the photosensor 38 and the control circuit 46.

Figure 3:
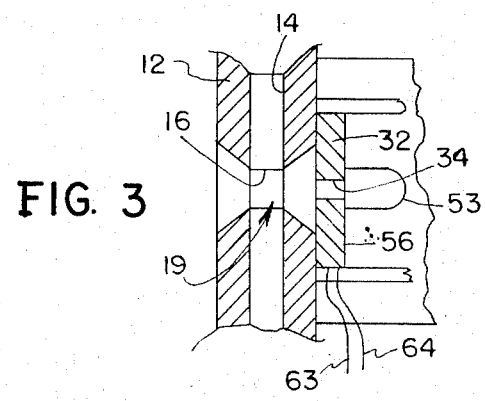
FIG. 3 is a fragmentary view of a portion of the optical scanning device shown in FIG. 1 and illustrates a modification thereof.

In some applications it may be desirable to trap the light. Such modification utilizing a light trap 53 mounted in the structure 36 for trapping the light which passes through the hole 34 in the photosensor 32 is shown in FIG. 3.

Figure 2:
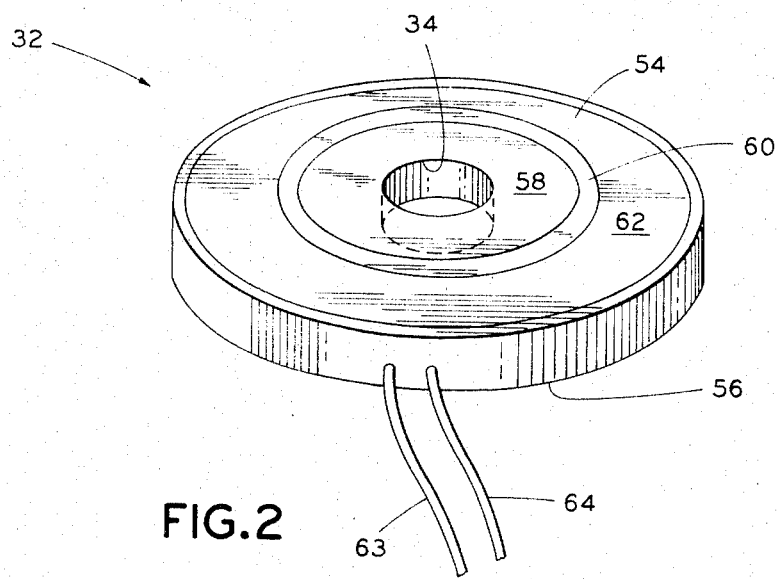
FIG. 2 is an enlarged perspective view of the novel photosensor of the present invention.

In one preferred embodiment of the present invention the photosensor 32 is a PIN photodiode with a passageway therethrough as best shown in FIG. 2. A PIN photodiode per se is known and is one in which a heavily doped $p$ region and a heavily doped $n$ region are separated by a nearly intrinsic $i$ region. The $i$ region resistivity can range from 10 ohm cm to 1,000,000 ohm cm, the $p$ and $n$ region resistivities being considerably less than 0.1 ohm cm. The distinguishing difference between a PIN and PN device is this resistivity or depletion depth within the $i$ region over which the electric field extends when a voltage is applied. A photodiode is a true PIN type when the applied voltage produces an electric field that extends completely across the $i$ region, and the device can then be called fully depleted. The advantages of the PIN type compared to the PN are improved response time, responsivity, and linearity.

The PIN photodiode 32 is generally disc shaped having oppositely facing spaced apart sides 54 and 56 with the side 54 having a photoreceiving surface 58 thereon. The surface 58 may be photosensitive or may be a thin transparent layer over a photosensitive surface. As a result, the photoreceiving surface is oftentimes referred to as the "photosensitive surface" when in fact the photosensitive surface may be beneath the photoreceiving surface.

In the illustrated embodiment the photoreceiving surface 58 is generally annular and extends radially outwardly from the periphery of the hole 34 to a guard ring 60. The guard ring 60 extends about the outer periphery of the photoreceiving surface 58 and separates the photoreceiving surface 58 from an annular mounting surface 62 which extends between the outer periphery of the guard ring 60 to the outer circumference of the PIN photodiode 32. The guard ring 60 stops or redirects leakage (migrant) currents (charges) so that they do not flow in the same loop as the photocurrent generated by light impinging upon the photoreceiving surface 58. It is to be noted, however, that in some PIN photodiodes a guard ring is not necessary.

In the illustrated embodiment of the PIN photodiode 32 of the photoreceiving surface 58 starts from the edge or periphery of the hole 34 and extends to the guard ring 60. It will be understood that in some applications it may be desirable to have the photoreceiving surface 58 start at a line or circle which is spaced radially outwardly from the edge or periphery of the hole 34.

In the operation of the device 10 a light beam is focused at the center of the view volume 19 and adjusted as desired by the feeback loop formed by the light source 20, the photosensor 38 and the control circuit 46. Then a given volume of fluent material containing suspended particles or bubbles is directed through the fluid passageway 14 and through the view volume. When some of the focused light strikes a particle or bubble it will be deflected or scattered and in the illustrated embodiment, forward scattered light deflected within a given angle, such as the angle a, will be received by and impinge upon the photoreceiving surface 58 while essentially only non-scattered light of the light beam (excepting perhaps light scattered at a very small angle from the axis 17 of the optical path) is passed through the hole 34. The scattered light impinging upon the photoreceiving surface 58 generates an electrical signal which is applied via leads 63 and 64 to an electrical system, not shown, for analyzing, measuring and otherwise utilizing the signal for making a determination of the size, number and/or concentration of particles or bubbles in the given volume of fluent material.

Figure 4:
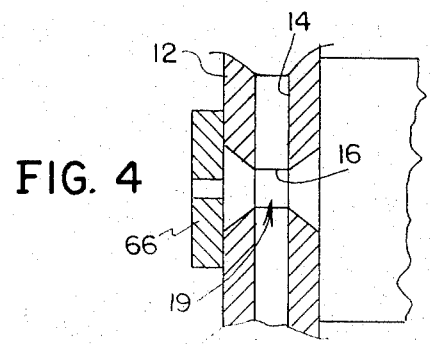
FIG. 4 is a fragmentary view of a portion of the optical scanning device shown in FIG. 1 and illustrates another modification thereof.

Although the photosensor 32 is positioned to receive forward scattered light, it will be understood that in some embodiments of the device 10 it may be more desirable to measure back scattered light. For this purpose, a photosensor 66 can be mounted at the upstream end of the optical passageway 16 as shown in FIG. 4 where it is in position to measure back scattered light, that is to say, light scattered backwardly when some of the light of the focused light beam strikes particles or bubbles in the fluent material passing through the view volume 19.

Figure 5:
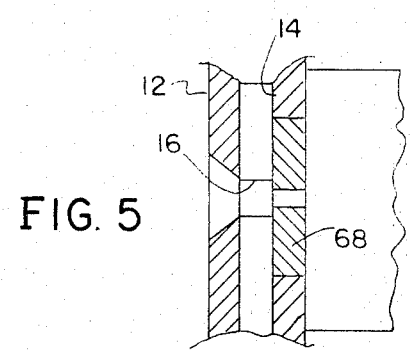
FIG. 5 is a fragmentary view of a portion of the optical scanning device shown in FIG. 1 and illustrates still another modification thereof.

In the device 10 of the present invention the position of the photosensor 32 relative to the view volume 19 can be adjusted as desired. In this respect the photosensor 32 can be positioned at a location further downstream from the sensing zone 19, such as, for example, at the position of the second photosensor 38. Alternatively and as shown in FIG. 5, the block 12 can be formed with a recess at the downstream end of the optical passageway 16 so that a photosensor 68 can be mounted with a photoreceiving surface thereof in line with the inner wall of the fluid passageway 14 and adjacent the view volume.

Although the preferred embodiments of the invention heretofore described are directed to an optical particle sensing device it is to be understood the teachings of the present invention can be utilized in other types of optical sensing or scanning devices. For example, instead of passing the focused light beam through the optical passageway 16 of the block 12, the light beam could be passed through a transparent or semitransparent solid material such as glass, plastic, etc. for making a determination of the impurities or bubbles within the solid material.

From the foregoing description it is apparent that the optical particles sensing device of the present invention and the novel photosensor used therewith provide a smaller, simpler and more efficient system for sensing forward or back scattered light and for eliminating stray light from the light beam than the devices heretofore proposed. In particular the device and novel photosensor of the present invention obviate the need for light catching and dissipating tubes or traps as well as the need for light reflectors previously used in optical particle sensing devices.

Some of the important advantages of the sensing device of the present invention and the novel photosensor used therein can be summarized in part as follows:

1. The photodetecting or photoreceiving surface 58 can be located very close to the sensing zone (the viewing volume) thereby reducing the area of photosensitive surface required and increasing the solid angle of deflected light sensed by the photosensor 32.

2. A reflector is no longer necessary.

3. The photosensitive area can be much smaller than the photosensitive area in conventional photomultipliers used in presently available optical sensing devices and still catch almost all the forward or back scattered light.

4. The area reduction improves the signal-to-noise ratio of the photosensor.

5. By utilizing a semiconductor photodetector a much simpler, less expensive and more efficient system is obtained. In this respect and as noted above a PIN photodiode has a higher signal-to-noise ratio than a photomultiplier tube, can be mounted extremely close to the sensing zone and can be easily fabricated with holes and sensitive areas of different two or three dimensional shapes. Also by using a semiconductor photodetector in place of a conventional photomultiplier, a smaller and less expensive voltage supply can be used.

6. With the system of the present invention several light sources of the same or different type can be used with several holes in one photosensor for detecting side scattering in combination with suitable switching and circuitry for determining additional particle or discontinuity characteristics.

7. Alignment of the light beam with respect to the center of the view volume can be more easily obtained with the sensing device of the present invention since the light beam passing through the hole 34 in the photosensor 32 can be easily monitored and then adjusted as desired.

8. The major portion of the focused light beam is passed through the hole 34 such that this light beam can be used for actuating a second photosensor in a control circuit or in a feedback loop for controlling the light intensity from the light source 20 relative to the light received by the second photosensor.

In summary, the device of the present invention and the novel photosensor used therein provide a very versatile and flexible optical scanning device having numerous advantages and applications, some of which have been described herein and others of which are inherent in the invention; and, it is to be understood that obvious modifications can be made to the optical scanning device of the present invention without departing from the spirit or scope of the invention. Accordingly the scope of the present invention is only to be limited as necessitated by the following claims.

What is desired to be secured by Letters Patent of the United States is:

1. An optical scanning device including means for forming a sensing zone, means for focusing a light beam into said sensing zone and means for sensing some of the light scattered from said sensing zone, said scattered light sensing means comprising a photosensor having two sides, a photoreceiving surface on one of said sides, a passageway extending through said photosensor between said sides, said photosensor being situated near said sensing zone and in the path of said light beam with said passageway aligned with said light beam whereby said light beam passes through said passageway and essentially only scattered light impinges upon said photoreceiving surface of said photosensor and a second photosensor without a passageway therethrough situated in the path of said light beam downstream from said first photosensor and in alignment with said passageway in said first photosensor for receiving, and being actuated by, light which passes through said passageway.

2. The optical scanning device as defined in claim 1 including a light source and circuit means connected to said light source and to said second photosensor for controlling the light output from said light source relative to the light received by said second photosensor.

3. An optical particle sensing device comprising first means for passing a fluid flow stream containing particles through said device including means forming a fluid passageway for said fluid flow stream and an optical passage means extending through and transversely of said fluid passageway for passing a beam of light through said fluid passageway, the space at the intersection of said fluid passageway and said optical passage means defining a view volume, a light source for generating a light beam, a condensor lens and an objective lens positioned between said light source and said first means and in the path of said light beam, an iris which has a predetermined aperture and which is positioned between said condensor lens and said objective lens and in the path of said light beam, said objective lens being adapted to direct the light passing through said aperture of said iris into said view volume, and a photosensor situated in the path of said light beam and near one end of said optical passage means, said photosensor having two sides, a photoreceiving surface on one side thereof and a passageway extending through said photosensor between said sides, said photosensor being arranged so that said photoreceiving surface is in position to receive some of the light scattered by particles passing through said view volume and said photosensor passageway is aligned with said light beam whereby said light beam passes through said photosensor passageway.

4. The optical particle sensing device as defined in claim 3 wherein said photosensor is a PIN photodiode.

5. The optical particle sensing device as defined in claim 3 wherein said photoreceiving surface is situated adjacent the periphery of said photosensor passageway and extends radially outwardly from the periphery of said photosensor passageway.

6. The optical particle sensing device as defined in claim 3 wherein said photoreceiving surface is generally annular extending about said photosensor passageway and is coaxial with the axis of said photosensor passageway.

7. The optical particle sensing device as defined in claim 3 wherein said photosensor is adjustably mounted in said device whereby the position of said photoreceiving surface can be located flush with a side of said fluid passageway adjacent said view volume or at a predetermined distance from said view volume for sensing light scattered within different given angles from the axis of the path of said light beam.

8. The optical particle sensing device as defined in claim 3 wherein said photosensor is mounted in said device with said photoreceiving surface flush with a side of said fluid passageway adjacent said view volume.

9. The optical particle sensing device as defined in claim 3 wherein said photosensor is mounted in said device with said photoreceiving surface positioned at a predetermined distance from said view volume.

10. The optical particle sensing device as defined in claim 3 wherein said photosensor is positioned to receive forward scattered light on the photoreceiving surface thereof.

11. The optical particle sensing device as defined in claim 3 wherein said photosensor is positioned to receive back scattered light on the photoreceiving surface thereof.

12. The optical particle sensing device as defined in claim 3 including a second photosensor without a passageway therethrough positioned in the path of said light beam downstream from said view volume and in alignment with said photosensor passageway in said first photosensor for receiving light which passes through said photosensor passageway.

13. The optical particle sensing device as defined in claim 12 including control circuit means connected to said light source and to said second photosensor for controlling the light output from said light source relative to the intensity of light received by said second photosensor.

\* \* \* \* \*

UNITED STATES PATENT OFFICE
CERTIFICATE OF CORRECTION

Patent No. 3,786,261　　　　　　　Dated January 15, 1974

Inventor(s) Lorn Kenneth Tucker

It is certified that error appears in the above-identified patent and that said Letters Patent are hereby corrected as shown below:

Column 2, line 15, after "from" insert -- the point of light scattering. Of course, instead of enlarging the area of the photo receiving surface one can utilize reflectors to --; line 49, change "1961" to -- 1971 --.

Signed and sealed this 12th day of November 1974.

(SEAL)
Attest:

McCOY M. GIBSON JR.
Attesting Officer

C. MARSHALL DANN
Commissioner of Patents